(12) United States Patent
Bond

(10) Patent No.: US 7,279,910 B2
(45) Date of Patent: Oct. 9, 2007

(54) SANITARY PROBE SEAL

(75) Inventor: Richard Bond, Pattersonville, NY (US)

(73) Assignee: Anderson Instruments Co., Inc., Fultonville, NY (US)

( * ) Notice: Subject to any disclaimer, the term of this patent is extended or adjusted under 35 U.S.C. 154(b) by 15 days.

(21) Appl. No.: 11/010,673

(22) Filed: Dec. 13, 2004

(65) Prior Publication Data

US 2006/0125497 A1    Jun. 15, 2006

(51) Int. Cl.
*G01R 31/02* (2006.01)
*G01R 31/26* (2006.01)

(52) U.S. Cl. ..................................... 324/754
(58) Field of Classification Search ............... None
See application file for complete search history.

(56) References Cited

U.S. PATENT DOCUMENTS

| | | | |
|---|---|---|---|
| 3,339,411 A | | 9/1967 | Riffie |
| 3,417,786 A | | 12/1968 | Schnabel |
| 3,974,696 A | * | 8/1976 | Fitzmayer ................... 374/155 |
| 4,122,322 A | * | 10/1978 | Ohkubo et al. ............. 219/712 |
| 4,252,993 A | | 2/1981 | Beaman |
| 4,466,777 A | | 8/1984 | Kimberlin |
| 4,871,964 A | * | 10/1989 | Boll et al. ................... 324/754 |
| 4,879,902 A | | 11/1989 | Loniello |
| 5,295,206 A | | 3/1994 | Mischenko |
| 6,229,327 B1 | * | 5/2001 | Boll et al. ................... 324/762 |
| 6,963,207 B2 | * | 11/2005 | Root et al. ................... 324/754 |
| 7,112,298 B2 | * | 9/2006 | Kampa et al. ............... 264/301 |

* cited by examiner

*Primary Examiner*—Ha Tran Nguyen
*Assistant Examiner*—Trung Q. Nguyen
(74) *Attorney, Agent, or Firm*—Hoffman, Warnick & D'Alessandro LLC

(57) ABSTRACT

The present invention is an elastic seal for use with a sanitary probe. The elastic seal forms a layer between the probing member and the coating member to eliminate the formation of voids between the two. The elastic seal may include an elastic substance, such as silicon or rubber, to enable it to remain in contact with both the probing member and the coating member in the case that a change in temperature causes either or both to expand or contract. The elastic seal may have a coefficient of thermal expansion that is intermediate to a coefficient of thermal expansion of the probing member and a coefficient of thermal expansion of the coating member. The elastic seal prevents voids from forming in the probe assembly into which outside materials may enter.

16 Claims, 3 Drawing Sheets

SANITARY PROBE SEAL

BACKGROUND OF THE INVENTION

1. Technical Field

The present invention relates generally to probes, and more particularly, to an elastic seal for use with a sanitary probe for probing a substance.

2. Related Art

Historically, one of the preferred ways to monitor the amount, temperature, pressure or viscosity of a substance, particularly that of a liquid, in a closed container is with the use of a probe assembly. Most probe assemblies are long and thin and have at least one probing member that is designed to send a signal, such as an electrical charge when contacted by a liquid. The probing member is often made of stainless steel or other corrosion resistant electrical conductor. Probe assemblies are also often coated with an adhesion resistant coating member that includes a substance such as polytetrafluoroethylene, known under one brand as Teflon™. This coating member allows the probe assembly to remain sanitary due to its easy cleanability.

One shortcoming in the art has been a tendency of the probing member and the coating member to separate, forming a void between the two. This may be caused by the extreme difficulty in forming a perfect seal between the substances in the probing member and the coating member during manufacture. Further separation of the two may be caused by distinctively different coefficients of thermal expansion (CTE) of the materials used for the probing member and the coating member, for example those of stainless steel and polytetrafluorethylene. As a result, one of the materials expands or contracts more quickly than the other in the case of a change in temperature, causing the two to separate. The substance may enter the void caused by this separation, especially if the probe assembly is used in a high pressure application, and cause the probe to lose sanitary status or cross contaminate a later substance into which the probe assembly is inserted.

In view of the foregoing, there is a need in the art for a sanitary probe that lessens the likelihood the electrode and coating will separate to form a void.

SUMMARY OF THE INVENTION

The present invention is an elastic seal for use with a sanitary probe. The elastic seal forms a layer between the probing member and the coating member to eliminate the formation of voids between the two. The elastic seal may include an elastic substance, such as silicon or rubber, to enable it to remain in contact with both the probing member and the coating member in the case that a change in temperature causes either or both to expand or contract. The elastic seal may have a coefficient of thermal expansion that is intermediate to a coefficient of thermal expansion of the probing member and a coefficient of thermal expansion of the coating member. The elastic seal prevents voids from forming in the probe assembly into which outside materials may enter.

A first aspect of the invention is directed to a seal for use with a probe assembly having a probing member and a coating member, the seal comprising: an elastic member between the probing member and the coating member.

A second aspect of the invention is directed to a seal for use with a sanitary probe assembly having a probing member and a coating member, the seal comprising: an elastic member between the probing member and the coating member, the elastic member having a coefficient of thermal expansion intermediate to a coefficient of thermal expansion of the probing member and a coefficient of thermal expansion of the coating member.

A third aspect of the invention is directed to a probe assembly, comprising: a probing member for probing a substance; an elastic seal surrounding at least a portion of the probing member; and a coating member surrounding at least a portion of the elastic seal.

A fourth aspect of the invention is directed to a method for making a sanitary probe, the method comprising the steps of: providing a probing member; covering at least a portion of the probing member with an elastic seal; and covering at least a portion of the elastic seal with a coating member.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Figure 1:
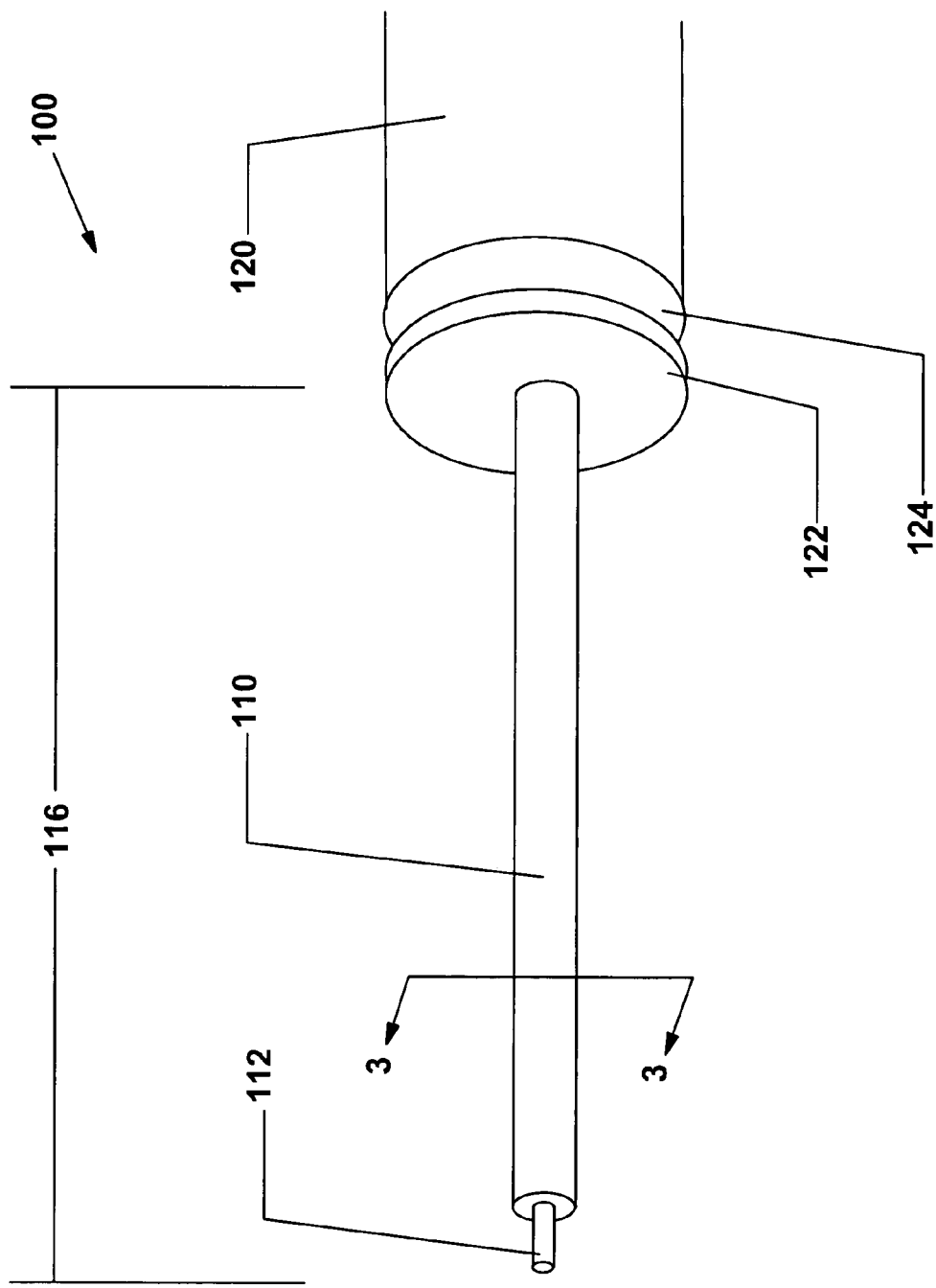
FIG. 1 shows a perspective view of a sanitary probe according to the invention.
Figure 2:
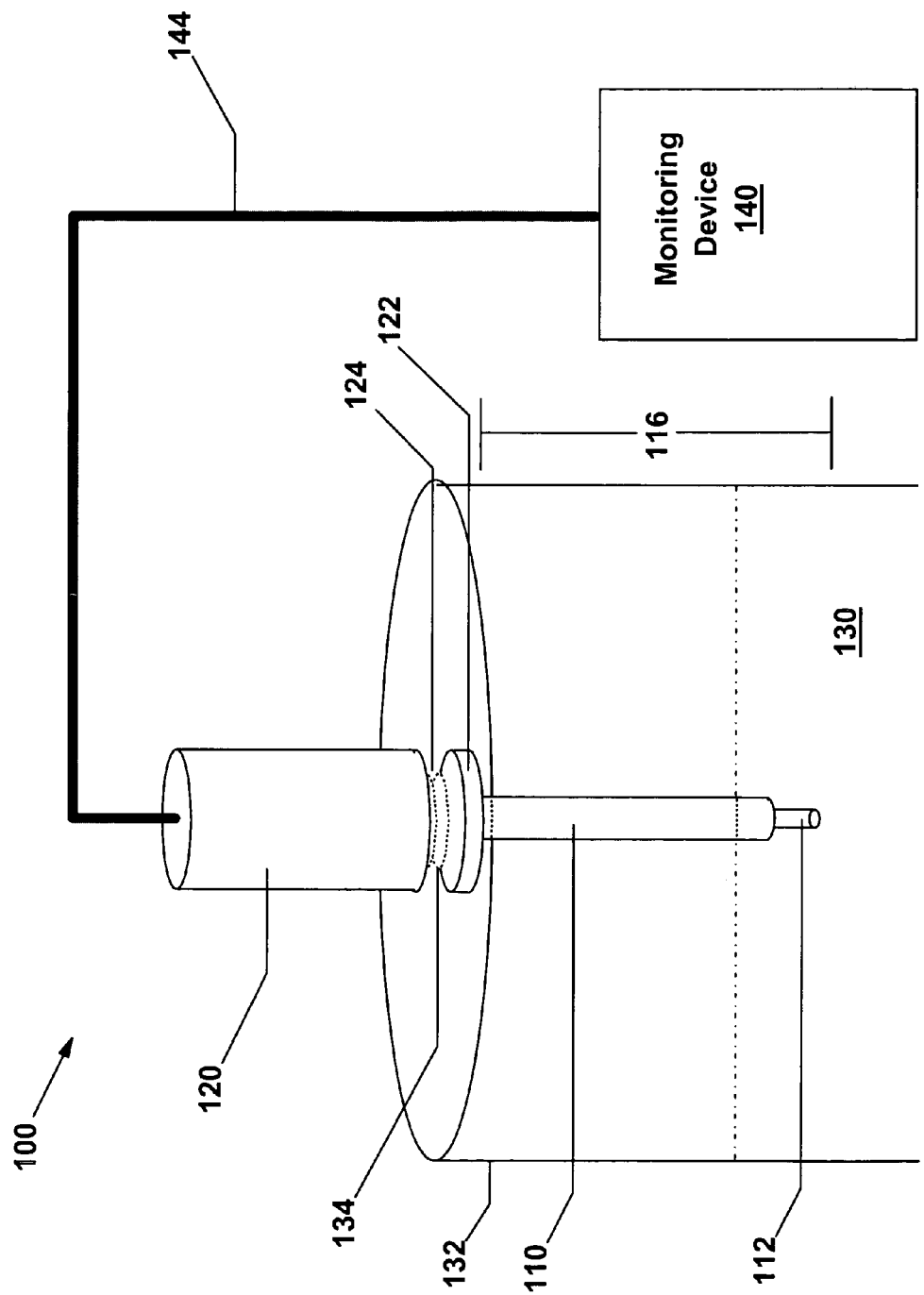
FIG. 2 shows a perspective view of a container containing a substance that is being probed using a probe according to the invention.

FIGS. 1-2 show a sanitary probe 100 according to the invention. Sanitary probe 100 has a probe assembly 110 and a handle assembly 120. The cross section of probe assembly 110 may be circular as shown or may be ovoid, polygonal, asymmetrical or any other shape necessary to perform its task. Probe assembly 110 may have a tip 112 that may be used to determine the presence of a substance 130. Tip 112 may determine the presence of a substance 130 that may be contained in a container 132 by measuring a change in resistance, pressure, viscosity, temperature or any other factor now known or later developed in the art. Tip 112 may also be used to measure other attributes of substance 130, such as resistance, pressure, viscosity, temperature or any other attribute that a user wishes to measure. Tip 112 may send a signal to a monitoring device 140 (FIG. 2) regarding the presence or attributes of substance 130. Monitoring device 140 may be a part of sanitary probe 100 or may be external to sanitary probe 100 as illustrated in FIG. 2. Monitoring device 140 may monitor one or a number of sanitary probes 100. Monitoring device 140 may be a stand-alone device or may comprise part of a larger device such as a computer system (not shown). The signal may be sent from tip 112 through probe assembly 110 and handle assembly 120 to monitoring device 140 by way of a signal conductor 144. Alternatively, the signal may be sent to monitoring device 140 by wireless transmitter (not shown) or via any other method of signal communication now known or later developed. Probe assembly 110 has a length 116 that is appropriate for determining the presence or attributes of substance 130.

As stated above, sanitary probe 100 may also have a handle assembly 120. Handle assembly 120 may house a portion of probe assembly 110. Handle assembly 120 may house one probe assembly 110 (FIG. 2) or multiple probe assemblies (not shown). Handle assembly 120 may be used by a user to hold sanitary probe 100 while probing substance 130, to insert sanitary probe 100 into container 132 such as through an aperture 134, to extract sanitary probe 100 from container 132, to transport sanitary probe 100, to store sanitary probe 100 or for any other contemplated purpose.

Sanitary probe 100 may have a connector 122 for coupling sanitary probe 100 and container 132. Connector 122 may be located on probe assembly 110, on handle assembly 120 or on any other envisioned part of sanitary probe 100. Connector 122 may include a groove 124 such as the one shown in FIG. 2 for inserting sanitary probe 100 into aperture 134 of container 132. Alternatively, connector 122 may include screw, weld, cement, hook and latch, or any other means of coupling now known or later developed.

Figure 3:
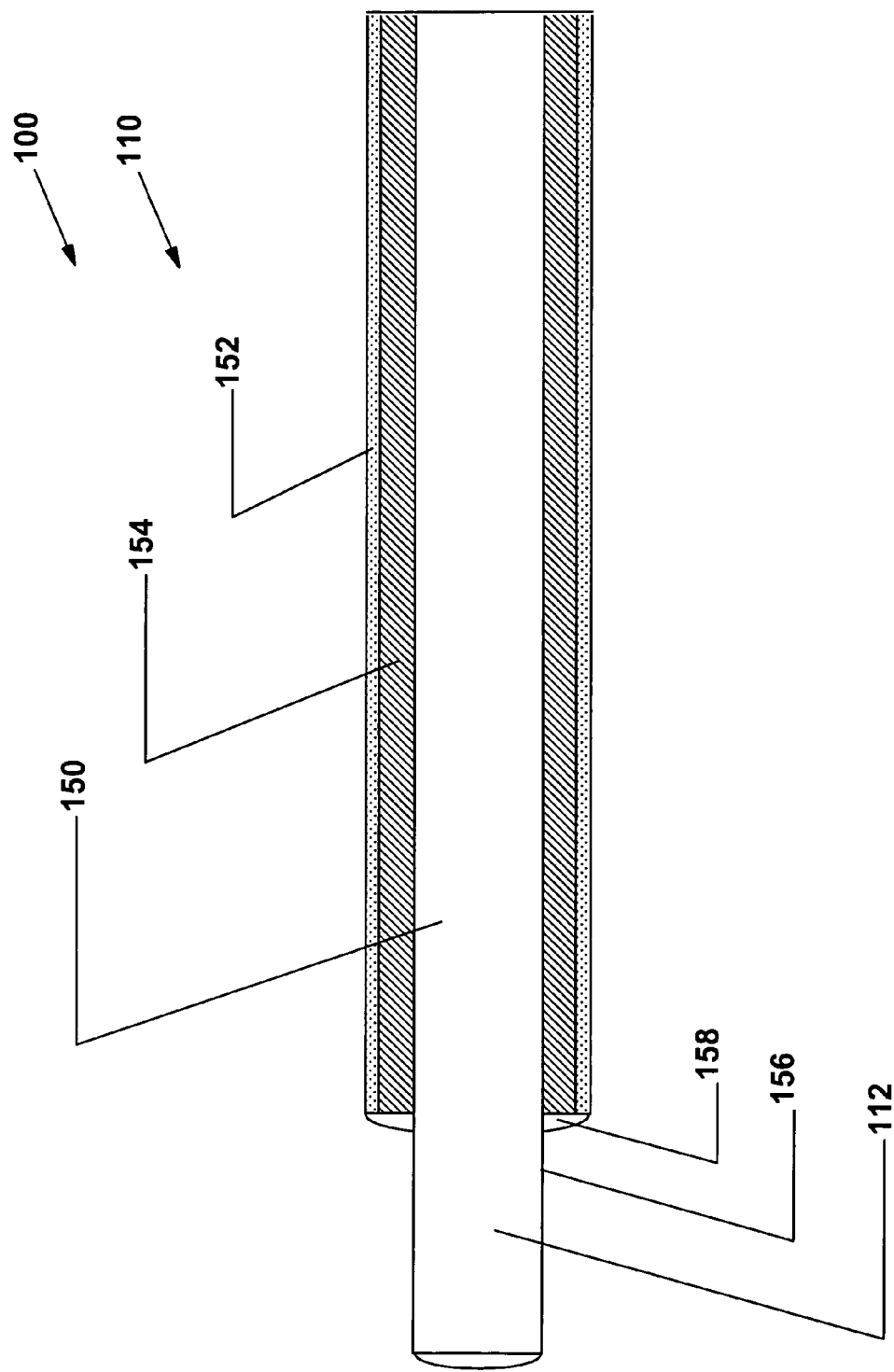
FIG. 3 shows a cross sectional view of a portion of a probe assembly of a sanitary probe of FIGS. 1 and 2 according to the invention

FIG. 3 shows a cross sectional view of a portion of probe assembly 110 of sanitary probe 100 of FIGS. 1 and 2 according to the invention. Probe assembly 110 may have a probing member 150, a coating member 152 and an elastic seal 154 between probing member 150 and coating member 152. Probing member 150 may be an electrode, a thermal sensor, a viscosity sensor, a pressure sensor or any other device for probing substance 130 (FIG. 2) now known or later developed. Probing member 150 may be made of a single substance such as stainless steel or may include an alloy. Probing member 150 may also include a device such as a semiconductor chip, a wireless transmitter, or any other device now known or later developed for probing, signal transmission or any other contemplated purpose. Probing member 150 may form the entire surface 156 of probe assembly 110 at tip 112.

As stated above, probe assembly 110 may also have coating member 152. Coating member 152 may surround at least a portion of probing member 150. Coating member 152 may be used to separate at least a portion of probing member 150 from substance 130. Coating member 152 may also resist adhesion with substance 130. As such, coating member 152 may include polytetrafluoroethylene, perfluoroalkoxy, fluorinated ethylenepropylene, or any other adhesion resistant substance or a combination thereof. If coating member 152 includes fluorinated ethylenepropylene, the fluorinated ethylenepropylene may be in the form of fluorinated ethylenepropylene shrink tubing, which may cause coating member 152 to apply a compressive clamping force in the direction of probing member 150.

As also stated above, probe assembly 110 includes elastic seal 154, which separates probing member 150 and coating member 152 along at least a portion of probe assembly 110. Elastic seal 154 forms a barrier between probing member 150 and coating member 152 to prevent a void from forming between probing member 150 and coating member 152 into which substance 130 may enter. Elastic seal 154 may be elastic and may expand and contract to remain in contact with both probing member 150 and coating member 152 through a change in temperature that may otherwise cause probing member 150 and coating member 152 to separate by expanding or contracting at different rates. To facilitate this, elastic seal 154 may have a coefficient of thermal expansion (CTE) that is intermediate to the coefficient of thermal expansion of probing member 150 and the coefficient of thermal expansion of coating member 152. Elastic seal 154 may include silicon, rubber, Fluorocarbon, Nitrile, Chloroprene or any other elastimer now known or later developed. Additionally, elastic seal 154 may take the form of silicon rubber tubing and may form a gasket between probing member 150 and coating member 152 under compression of coating member 152 that includes a compressive substance such as fluorinated ethylenepropylene shrink tubing. A portion of elastic seal 154 may be exposed to substance 130, such as, for example, an end 158 adjacent to tip 112. Alternatively, coating member 152 may completely cover elastic seal 154 so that no part of elastic seal is exposed to substance 130. To this end, coating member 152 may extend to cover end 158 of elastic seal 154 and abut probing member 150. Alternatively, probing member 150 may increase in diameter at tip 110, allowing coating member 152 to abut probing member 150 and cover elastic seal 154 so that no portion of elastic seal is exposed to substance 130.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A seal for use with a probe assembly having a probing member and a coating member, the seal comprising:
    an elastic member between the probing member and the coating member,
    wherein the elastic member is designed to prevent an intrusion of a foreign substance between the probing member and the coating member, and
    wherein the elastic member has a coefficient of thermal expansion that is intermediate to a coefficient of thermal expansion of the probing member and a coefficient of thermal expansion of the coating member.

2. The seal of claim 1, wherein the coating member resists adhesion with a substance.

3. The seal of claim 1, wherein the coating member includes at least one of polytetrafluoroethylene, perfluoroalkoxy and fluorinated ethylenepropylene.

4. The seal of claim 1, wherein the coating member includes fluorinated ethylenepropylene heat shrink tubing.

5. The seal of claim 1, wherein the elastic member includes at least one of silicon, rubber, fluorocarbon, nitrile, and chloroprene.

6. The seal of claim 5, wherein the elastic member includes silicon rubber tubing.

7. The seal of claim 1, wherein the elastic member prevents a separation of the probing member and the coating member in the case of a change in temperature.

8. A seal for use with a sanitary probe assembly having a probing member and a coating member, the seal comprising:
    an elastic member between the probing member and the coating member, the elastic member having a coefficient of thermal expansion intermediate to a coefficient of thermal expansion of the probing member and a coefficient of thermal expansion of the coating member.

9. The seal of claim 8, wherein the elastic member prevents a separation of the probing member and the coating member in the case of a change in temperature.

10. A probe assembly, comprising:
    a probing member for probing a substance;
    an elastic seal surrounding at least a portion of the probing member; and
    a coating member surrounding at least a portion of the elastic seal,
    wherein the elastic seal has a coefficient of thermal expansion that is intermediate to a coefficient of thermal expansion of the probing member and a coefficient of thermal expansion of the coating member.

11. The probe assembly of claim 10, wherein the coating member resists adhesion with the substance.

12. The probe assembly of claim 10, wherein the coating member includes at least one of polytetrafluoroethylene, perfluoroalkoxy and fluorinated ethylenepropylene.

13. The probe assembly of claim 10, wherein the coating member includes fluorinated ethylenepropylene heat shrink tubing.

14. The probe assembly of claim 10, wherein the elastic seal includes at least one of silicon, rubber, fluorocarbon, nitrile, and chloroprene.

15. The probe assembly of claim 14, wherein the elastic seal includes silicon rubber tubing.

16. The probe assembly of claim 10, wherein the elastic seal prevents a separation of the probing member and the coating member in the case of a change in temperature.

* * * * *